United States Patent [19]

Massouda

[11] Patent Number: 5,116,649
[45] Date of Patent: May 26, 1992

[54] OXYGEN AND FLAVOR BARRIER LAMINATE FOR LIQUID PACKAGING

[75] Inventor: Debora F. Massouda, Silver Spring, Md.

[73] Assignee: Westvaco Corporation, New York, N.Y.

[21] Appl. No.: 732,744

[22] Filed: Jul. 18, 1991

Related U.S. Application Data

[63] Continuation of Ser. No. 417,068, Oct. 4, 1989, abandoned.

[51] Int. Cl.$^5$ ............ B65D 85/00; B32B 27/10; B32B 31/00
[52] U.S. Cl. .................... 428/34.2; 156/82; 156/244.23; 428/349; 428/513
[58] Field of Search .......... 428/34.2, 513, 349; 156/82, 244.23

[56] References Cited

U.S. PATENT DOCUMENTS

| 4,513,036 | 4/1985 | Thompson et al. | 428/349 |
| 4,701,360 | 10/1987 | Gibbons et al. | 428/34.2 |
| 4,789,575 | 12/1988 | Gibbons et al. | 428/34.2 |

OTHER PUBLICATIONS

Barrier Coextrusion Coating as a Foil Replacement in Paperboard Lamination, Dragan Djordjevic, Apr. 4-6, 1984 pp. 119-148.
Extrusion Coaters Gear for New Packaging Action, Plastics World, Mark Schlack, Jul. 1984, pp. 42-47.

*Primary Examiner*—James J. Seidleck
*Attorney, Agent, or Firm*—Brumbaugh, Graves, Donohue & Raymond

[57] ABSTRACT

A heat-sealable paperboard laminate for liquid packaging which does not transmit nor absorb oxygen or flavor and odor ingredients comprises paperboard sandwiched between two layers of heat-sealable low density polyethylene polymer (LDPE) and including a three-component product-contact barrier layer coextruded onto the inner layer of LDPE. The barrier layer comprises ethylene vinyl alcohol copolymer (EVOH)/a tie layer (Plexar 177 or 175)/ low density polyethylene polymer (LDPE).

9 Claims, 1 Drawing Sheet

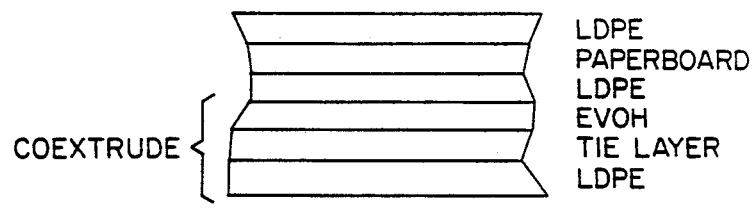
FIG. 1
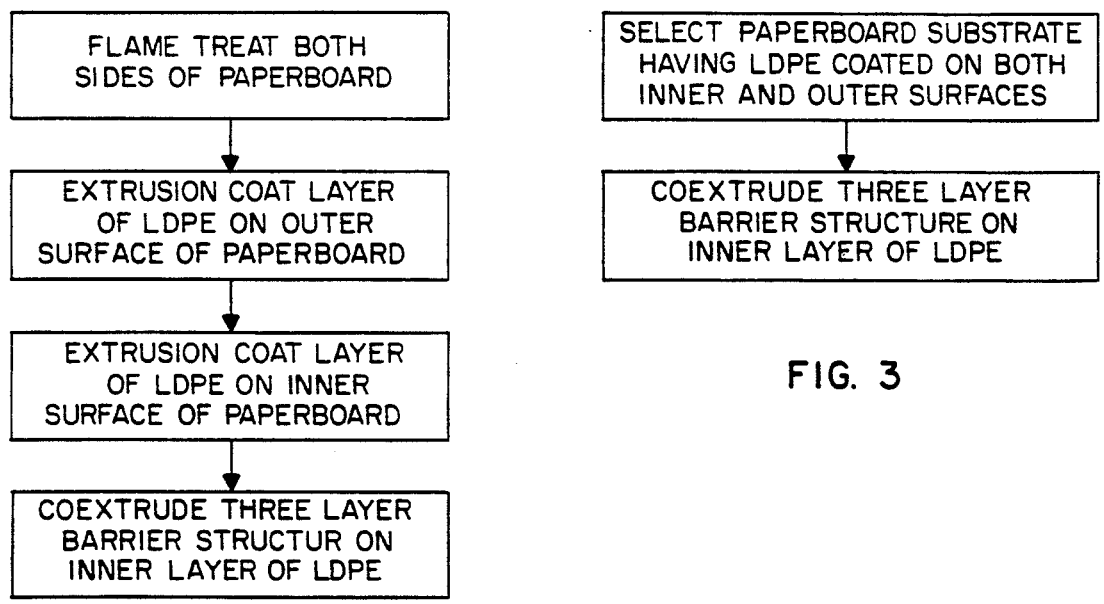
FIG. 2
FIG. 3

OXYGEN AND FLAVOR BARRIER LAMINATE FOR LIQUID PACKAGING

This application is a continuation of application Ser. No. 417,068, filed on Oct. 4, 1989 is now abandoned.

Cross-reference to Related Applications

The present invention is an improvement in co-pending U.S. application Ser. No. 07/352,937, filed May 17, 1989, entitled "Paperboard Laminate", owned by the present assignee herein.

BACKGROUND OF INVENTION

The present invention relates to a heat-sealable paperboard laminate, and more particularly to a non-foil barrier laminate which does not transmit or absorb flavor or odor ingredients of citrus and other juices.

Heat-sealable low density polyethylene (LDPE) is a well known component of the prior art paperboard citrus juice cartons, but it falls short of providing adequate barrier properties to the absorption and/or transmission of citrus juice flavor and odor ingredients. Therefore, additional barrier materials must be added to the laminate structure to achieve adequate barrier properties. In the family of barrier polymers, materials frequently used include: ethylene vinyl alcohol copolymers (EVOH); polyvinylidene chloride and its copolymers (PVDC); polyacrylonitrile and its copolymers (PAN); polyamides (PA): polyethylene terephthalate (PET); polyvinyl chloride (PVC); and polypropylene (PP). Of these materials, EVOH is the preferred material (see article entitled "HIGH BARRIER POLYMERS", by A.L. Blackwell, 1986 Coextrustion Seminar Marriott Hilton Head, Hilton Head, SC, published by TAPPI Press).

EVOH resins are saponified copolymers of ethylene and vinyl acetate. They are characterized as having premier gas barrier properties which resist the permeance of gases such as oxygen and $CO_2$ for the preservation of food and beverages. EVOH resins also have excellent resistance to oil and organic solvents, thus making them suitable for packaging of oily foods, edible oils, mineral oils agricultural pesticides and organic solvents. They also have excellent fragrance preservation, and packages based on EVOH resins preserve the aroma and flavor of the contents and at the same time prevent entry of fugitive or foreign odors into the package.

Unfortunately EVOH resins have little or no adhesion characteristics to most other polymers except nylon. In addition, EVOH resins are sensitive to the effects of moisture, and the barrier properties are reduced with increasing relative humidity. For this reason, adhesive resins, usually modified polyolefins, have been developed for use in coextrusion applications for incorporating EVOH as a barrier material in barrier laminates. Thus EVOH when incorporated as a barrier component in packaging material is included in a symmetrical sandwich comprising a tie layer/EVOH/tie layer composite, as taught by the prior art, including U.S. Pat. Nos. 4,407,897; 4,789,575; 4,802,943; and, in PACKAGING Magazine, September 1984, pp. 55-60. This combination provides good barrier properties while at the same time protecting the EVOH component from the deteriorating effects of moisture. However, the sandwich construction is an expensive application because of the use of two tie layers. Also in some prior art applications, particularly as shown in the aforementioned '575 patent, where the sandwich tie layer/EVOH/tie layer is applied directly to an uncoated surface of paperboard, it is difficult to achieve proper adhesion of the tie layer to the paperboard surface at a temperature which does not cause degradation and reduced efficiency of the EVOH barrier layer material.

To overcome these and other problems, the present invention omits a tie layer from a conventional EVOH sandwich structure which reduces costs, and adhers the EVOH component of the coextrusion directly to a surface of the paperboard which has previously been coated with LDPE. The ability to heat seal EVOH to LDPE is taught by U.S. Pat. No. 4,702,360. Nevertheless, the present invention is an improvement in the '360 patent because unlike the '360 patent, the EVOH layer in the present invention is not directly exposed to the contents of any package made with the laminate.

SUMMARY OF INVENTION

It is an object of the present invention to provide an improved heat-sealable, non-foil laminate for fruit or citrus juices, beverages and the like which is cheaper to manufacture than the prior art laminates and which provides more reliable performance in use. In one embodiment of the present invention, an existing commercial structure for paperboard cartons comprising paperboard sandwiched between two layers of low density polyethylene (LDPE) is selected as the base material. Subsequently, in a single manufacturing step, a three layer barrier structure comprising EVOH/tie layer/LDPE is coextruded onto the surface of one of the layers of LDPE. The coextrusion step is preferably preceded by a flame treatment step to the surface of the LDPE onto which the coextrusion is applied. In an alternative embodiment, the laminate can be made in-line by selecting a paperboard substrate, flame treating both surfaces of the paperboard substrate, extrusion coating a layer of LDPE onto the outer surface of the paperboard substrate, extrusion coating a layer of LDPE onto the inner surface of the paperboard substrate, flame treating the exposed surface of the LDPE layer applied to the inner surface of the paperboard substrate, and coextruding the aforementioned three layer structure onto the flame treated layer of LDPE. The final structure in either case yields a construction which includes polyethylene on its inner and outer surfaces to provide the most desirable heat-sealable characteristics, but which eliminates at least one tie layer while keeping the EVOH barrier layer protected from direct contact with any liquids packaged with the laminate. Paperboard containers constructed from the laminate of the present invention provide significant flavor oil retention of the citrus juices contained therein resulting in an extended shelf life for the juices.

BRIEF DESCRIPTION OF DRAWING

FIG. 1 is a cross-sectional elevational of the laminate of the present invention;

FIG. 2 is a block diagram representing a process for making the laminate of the present invention; and, FIG. 3 is a block diagram representing an alternative process for manufacturing the laminate of the present invention.

DETAILED DESCRIPTION

In a preferred embodiment of the present invention, the laminate is prepared as follows:

Stepwise, the paperboard substrate is flame treated, or a primer is applied to both surfaces, to achieve good adhesion of subsequently applied polymer layers. Second, a layer of up to 12 lbs/ream of LDPE is extrusion coated onto the outer surface of the paperboard substrate.

Thirdly, a layer of from about 7-14 lbs/ream of LDPE is extrusion coated onto the inner surface of the paperboard substrate. The exposed surface of the inner LDPE layer is then flame treated for improved adhesion, and lastly, a three component layer comprising EVOH/tie layer/LDPE is coextruded onto the flame treated surface of the LDPE layer. Typical coat weights for the three component layer are from about 4-10 lbs/ream EVOH; 3-5 lbs/ream tie layer: and 7-14 lbs/reams LDPE. An example of a typical tie layer material is Plexar 177 or Plexar 175,which are ethylene based copolymers modified with functional groups, available from USI Corporation. The result is a structure comprising from outer surface to inner surface LDPE/Paperboard/LDPE/EVOH/tie layer/LDPE. The laminate is used in packaging in a manner so that the coextruded layer becomes the inner layer of any cartons made from the laminate, and the laminate is scored, cut into blanks, folded and side seam heat-sealed between the inner and outer LDPE surfaces in a conventional manner.

In an alternative embodiment, the three component coextruded layer is applied directly onto the flame treated inner surface of a base material comprising paperboard sandwiched between two layers of LDPE. The outer LDPE surface may be corona treated for printing if desired. The laminate produced in either case exhibits excellent barrier properties and meets FDA requirements for use in food contact packaging. Any commercial extrusion coating grade of LDPE is suitable for use in the present invention. Ream size is 3000 square feet.

It will thus be seen that the present invention discloses a laminate having barrier characteristics equal to the most desirable products represented by the prior art, yet the product disclosed herein is cheaper to manufacture and more reliable in the field than many of the prior art products. It will also be understood that the coat weight ranges set forth herein are designed to accommodate different products packaged in the laminate.

What is claimed is:

1. A paperboard container, the container being constructed from a laminate comprising:
   (a) a paperboard substrate having opposed inner and outer surfaces;
   (b) a layer of heat-sealable, low density polyethylene polymer coated onto the outer surface of said paperboard substrate;
   (c) a layer of a heat-sealable, low density polyethylene polymer coated onto the inner surface of said paperboard substrate; and,
   (d) an inner, product contact sandwich comprising an ethylene vinyl alcohol copolymer layer, a tie layer, and a heat-sealable low density polyethylene polymer layer, the sandwich being coextruded in molten form onto the outer surface of the low density polyethylene polymer applied to the inner surface of said paperboard substrate wherein said ethylene vinyl alcohol copolymer layer is next to said low density polyethylene polymer layer coated on the inner surface of the paperboard substrate and the coextruded low density polyethylene polymer layer provides the product contact surface of the sandwich and forms a strong bond with the adjacent tie layer as a result of coextrusion therewith in molten form.

2. The product of claim 1 wherein the surface of the heat-sealable, low density polyethylene polymer layer coated onto the inner surface of the paperboard substrate is flame treated to improve adhesion of the coextruded layer.

3. The product of claim 2 wherein about 7-12 lbs/ream of heat-sealable, low density polyethylene polymer is coated onto the outer surface of said paperboard substrate.

4. The product of claim 3 wherein about 7-14 lbs/ream of heat-sealable, low density polyethylene polymer is coated onto the inner surface of said paperboard substrate.

5. The product of claim 4 wherein the inner, product contact layer coextruded onto the polyethylene polymer applied to the inner surface of said paperboard substrate comprises 4-10 lbs/ream ethylene vinyl alcohol copolymer, 3-5 lbs/ream tie layer, and about 7-14 lbs/ream low density polyethylene.

6. The product of claim 5 wherein said tie layer is an ethylene based copolymer modified with functional groups.

7. The process for manufacturing a heat-sealable paperboard laminate having enhanced gas barrier properties and improved resistance to the migration of essential oils and flavors comprising the steps:
   (a) flame treating the inner and outer surfaces of a paperboard substrate;
   (b) extrusion coating a layer of about 7-12 lbs/ream of a heat-sealable, low density polyethylene polymer onto the outer surface of said paperboard substrate;
   (c) extrusion coating a layer of about 7-14 lbs/ream of a heat-sealable, low density polyethylene polymer onto the inner surface of said paperboard substrate; and
   (d) coextruding a product contact sandwich comprising a layer of 4-10 lbs/ream of an ethylene vinyl alcohol copolymer, a layer of 3-5 lbs/ream of an adhesive tie layer, and a layer of 7-14 lbs/ream of a low density polyethylene polymer in molten form onto the outer surface of the polyethylene polymer layer applied to the inner surface of said paperboard substrate, wherein said coextruded layer of ethylene vinyl alcohol copolymer is next to said layer of low density polyethylene polymer coated on the inner surface of the paperboard substrate and the coextruded low density polyethylene layer provides the product contact surface of the sandwich and forms a strong bond with the adjacent tie layer as a result of coextrusion therewith in molten form.

8. The process of claim 7 further comprising:
   (e) flame treating the surface of the low density polyethylene layer applied to the inner surface of the paperboard substrate before the coextrusion step (d).

9. The process for manufacturing a heat-sealable paperboard laminate having enhanced gas barrier properties and improved resistance to the migration of essential oils and flavors comprising the steps:
(a) selecting a base material of paperboard having a layer of about 7–12 lbs/ream of a heat-sealable, low density polyethylene polymer applied to its outer surface and a layer of about 7–14 lbs/ream of a heat sealable, low density polyethylene polymer applied to its inner surface; and,
(b) coextruding onto the exposed surface of the layer of polyethylene polymer applied to the inner surface of the paperboard substrate a product contact sandwich comprising, a layer of 4–10 lbs/ream of an ethylene vinyl alcohol copolymer, a layer of 3–5 lbs/ream of an adhesive tie layer, and a layer of about 7–14 lbs/ream low density polyethylene in molten form, wherein said layer of ethylene vinyl alcohol copolymer is next to said layer of low density polyethylene polymer applied to the inner surface of the paperboard substrate and the coextruded low density polyethylene layer provides the product contact surface of the sandwich and forms a strong bond with the adjacent tie layer as a result of coextrusion therewith in molten form.

* * * * *